United States Patent [19]

Carpenter et al.

[11] Patent Number: 4,976,316

[45] Date of Patent: Dec. 11, 1990

[54] METHOD OF ACCELERATING SET OF CEMENT BY WASHOVER FLUID CONTAINING ALKANOLAMINE

[75] Inventors: Robert B. Carpenter, Hurst; William N. Wilson, Plano, both of Tex.

[73] Assignee: Atlantic Richfield Company, Los Angeles, Calif.

[21] Appl. No.: 481,293

[22] Filed: Feb. 20, 1990

[51] Int. Cl.$^5$ .................... E21B 33/138; E21B 33/16
[52] U.S. Cl. .................... 166/291; 166/285; 166/293
[58] Field of Search ............... 166/291, 292, 293, 300, 166/285; 106/90, 314, 315

[56] References Cited

U.S. PATENT DOCUMENTS

| 3,482,634 | 12/1969 | Cox | 166/300 X |
|---|---|---|---|
| 3,605,898 | 9/1971 | Harrison et al. | 166/293 |
| 4,257,814 | 3/1981 | Kellet et al. | 106/90 |
| 4,276,182 | 6/1981 | Beirute | 166/291 X |
| 4,519,452 | 5/1985 | Tsao et al. | 166/293 X |
| 4,524,163 | 6/1985 | Bradley et al. | 106/90 X |
| 4,548,270 | 10/1985 | Eilers | 166/291 |
| 4,606,770 | 8/1986 | Gerber | 106/90 |
| 4,741,782 | 5/1988 | Styron | 106/90 |
| 4,770,708 | 9/1988 | Atkins et al. | 106/90 X |
| 4,838,352 | 6/1989 | Oberste-Padtberg et al. | 166/291 |

Primary Examiner—George A. Suchfield
Attorney, Agent, or Firm—James C. Fails; Arthur F. Zobal; Geoffrey A. Mantooth

[57] ABSTRACT

A method of accelerating the set of retarded cement characterized by contacting the retarded cement slurry with a solution containing an effective amount of a compatible accelerator. The compatible accelerator is selected from the group consisting of triethanolamine, diethanolamine and monoethanolamine. This may be employed in overwashing operations, treating retarded cement that is injected into open areas in the well or treating the set of a plug of retarded cement in a well to effect acceleration and/or viscosification of the cement. Also disclosed are specific uses.

9 Claims, No Drawings

METHOD OF ACCELERATING SET OF CEMENT BY WASHOVER FLUID CONTAINING ALKANOLAMINE

FIELD OF THE INVENTION

This invention relates to cementing of oil and gas wells. More particularly, this invention relates to accelerating the set of cement that has been retarded to permit safe placement in long duration and long interval cementing operations and those operations where downhole contamination with drilling mud and displacement fluids produces excessive retardation of the cement.

BACKGROUND OF THE INVENTION

Excessive retardation by design is often a problem where wellbore temperature at the top of long liners is inadequate to insure a timely set of cement that has been retarded sufficiently to circulate past the higher wellbore temperatures present at the bottom of the well. Expensive remedial cement squeezes wherein the cement is retarded only enough to insure safe placement at the lower temperature present at the liner lap are typically the only means of insuring a proper cementation and hydraulic seal at the liner lap. An effective means of accelerating the cement set at the liner lap would eliminate the need for expensive remedial cement squeeze operations.

In squeeze cement applications it is desirable to set a retarded cement into open perforations and other void areas within the annular cement sheath or the formation to seal-off those formation intervals that are producing water and/or gas. Ideally the cement will set rapidly after placement. However, excessive retardation of the cement set often results from downhole contamination with the highly retarding drilling mud that may be present during the squeeze operation. The organic polymers and borates common to the fluids used to effect displacement or flushing of any excess cement from the wellbore at the end of some squeeze operations also create excessive retardation of the cement remaining in perforations or other squeezed areas. The risk of cement failure is increased by the longer set time as the cement remains vulnerable to flowback, gas or fluid-cut, and dislodgement until time of set. The 4–14 day WOC (Waiting-On-Cement) period that is common to achieve set after a coiled tubing squeeze operation produces additional operational costs. Hydrocarbon production is also lost or deferred during the extended WOC. It is desirable that a compatible accelerator be employed in some fashion to accelerate the set of the cement after placement.

The same is true when placing cement in the form of plugs in the wellbore. This may be for plugging back the well, forming pack-off or seal-off between formations and whipstock or kick-off operations. Cement plugs often fail to set within an allowable time span due to downhole commingling (contamination) with strongly retarding drilling fluids. Commingling results from placement mechanics and gravitational effects. It is desirable that an accelerator be employed to minimize or eliminate the set retarding effects and potential for downhole commingling.

Further, cement often becomes diluted with drilling mud or other downhole fluids due to gravitational exchange. Thixotropic or fast gelling cements are generally acknowledged to reduce this phenomena, but operational and temperature constraints often prevent their use in many cementing operations. It is desirable that a method be available to impart thixotropy or rapid gelation to the cement slurry after placement.

SUMMARY OF THE INVENTION

Accordingly, it is an object of the present invention to provided improved composition and method that will increase the set of retarded cement regardless of what operation it is employed in.

In accordance with one aspect of this invention, there is provided a method of accelerating the set of retarded cements by over washing a cement slurry with a solution of a compatible accelerator of triethanolamine, diethanolamine or monoethanolamine in an amount sufficient to impart rapid gelation and decrease the time it takes for the cement to set either in open perforations, fractures or other void areas, or in a plug in a wellbore.

In another aspect, this invention provides a method of treating a well in which the subterranean formation about the well may or may not be fractured and a low viscosity, retarded cement slurry is squeezed into any open areas of the well that will accept fluid and in which there is provided the improvement of washing over the cement with a solution of a compatible accelerator in an amount sufficient to accelerate the set of the cement. By compatible accelerators is meant triethanolamine, diethanolamine, or monoethanolamine, alone or together in admixture.

In another aspect of this invention there is provided a method of accelerating a cement plug in a well completed in a subterranean formation in which a retarded cement is pumped into the well and allowed to set to form a plug therewithin in which the improvement comprises washing over the cement plug with a solution of a compatible accelerator in an amount sufficient to accelerate the set of the cement.

Additional advantages include counteraction of the cement set retardation effected by in situ intermixing with the drilling fluid. This phenomena of in situ intermixing is also reduced by the rapid viscosification of the cement slurry upon contact with the compatible accelerator.

DESCRIPTION OF PREFERRED EMBODIMENTS

Compatible accelerators in accordance with this invention include amines selected from the group consisting of triethanolamine, diethanolamine and monoethanolamine. These amines, monoethanolamine, diethanolamine or triethanolamine, are described in Hackh's CHEMICAL DICTIONARY, Grant, Editor, Fourth Edition, Mcgraw Hill Book Company, New York, 1969. As shown therein, even the longest chain triethanolamine is a colorless liquid called trihydroxy triethylamine which boils at 227 degrees Fahrenheit at 150 millimeters mercury pressure. It is soluble in water and is commonly used as a soap base, oil emulsifier and reagent for antimony and tin in pharmaceutical formulations. It is commonly available from any chemical supplier, such as duPont, and does not require extended description herein.

In this invention the compatible accelerator is employed in a proportion or concentration in the range of about 0.1 to 100% by volume as an overwash or spotting fluid. The slug size of the compatible accelerator may be in the same ratio with respect to the cement plug size. Most preferably, while the concentration may vary slightly from this, it has been found that a slug of the compatible accelerator in the above range will be effective and will result in a setting of cement slurry in only about 24 hours when otherwise it would take from two to nine days for the retarded cement to set.

Other applications in which this is useful in about the same concentration is when an overwash is employed after squeezing cement into perforations and surrounding fractures. As indicated hereinbefore, the cement for such operations is retarded in order to provide adequate safe, pump time for safe placement of the cement into the fractures or perforations. Further, such severely retarded cement may be emplaced and then washed over with a solution containing the compatible accelerator. The differential pressure from the well out into the formation will probably carry the liquid that is employed as the overwash solution containing the compatible accelerator such as the triethanolamine, diethanolamine or monoethanolamine to the cement plug. Normally such pressure is in the range of 200–500 pounds per square inch (psi) greater in the well than it is in the formation so it tends to effect flushing of the overwash solution containing the compatible accelerator through the cement.

In another operation, the solution containing the accelerator may be spotted ahead of a cement to be placed in a well and the cement then spotted within the column and/or a spot of liquid containing the triethanolamine, diethanolamine or monoethanolamine is positioned above the cement in the well.

A surfactant may be employed in a small concentration of about 0.1–1 percent or so, if desired, to decrease the interfacial tension and help effect the overwash flow through the cement slurry.

Triethanolamine, diethanolamine or monoethanolamine at 0.1–100% is effective for the purpose of this invention. Preferably, a concentration of the compatible accelerator comprising the triethanolamine, diethanolamine or monoethanolamine is in the range of about 5% to 10% by volume of the cement.

The compatible accelerator has the property of accelerating the set of the cement and imparting rapid viscosification or gelation of the cement to minimize gravitational or surge movement of the emplaced cement slurry and has the potential for immediate application for acceleration of cement nodes in remedial squeeze operations, forming cement plugs in a well, or cementing at the top of liners; for example, for whipstock plug operations. Rapid strength development and immobilization of the cement after placement is critical to success in most cementing operations.

The following examples illustrate laboratory experiments performed to simulate field conditions and show effectiveness of triethanolamine, as the compatible accelerator.

EXAMPLE I

In this example, API Class G cement was employed with 1% fluid loss additive in the form of a hydroxy ethylcellulous and a dispersant blend with 0.5% powdered Kelig 32 lignosulfonate retarder and 44% fresh water, giving a cement with a density of 15.9 pounds per gallon. Table I hereinafter illustrates the compressive strength development under curing condition of 190 degrees Fahrenheit and atmospheric pressure.

TABLE I

| Sample # | Media (overwash) | @ 24 Hrs. | @ 64 Hrs. | Comments |
|---|---|---|---|---|
| 1 | Fresh Water | Not set | 2938 | Control |
| 2 | 25% Triethanolamine 75% Fresh Water | 1189 | 3027 | |
| 3 | 25% TEA 5% Sodium Silicate 70% Fresh Water | 1086 | 3081 | Precipitate formed in media |
| 4 | 25% TEA 75% Freshwater | Not Set | 3412 | |

EXAMPLE II

The same cement was made as employed above and cured under the same conditions.

TABLE II

Summarizes the results

| Sample # | Media (overwash) | @ 24 Hrs. | @ 41 Hrs. | Comments |
|---|---|---|---|---|
| 2-1 | Fresh water | Not Set | 45 | Control |
| 2-2 | 20% TEA 80% Fresh Water | 1724 | 2081 | |
| 2-3 | 10% TEA 90% Fresh Water | 1894 | 2411 | |
| 2-4 | 5% TEA 95% Fresh Water | 1515 | 1856 | |
| 2-5 | 10% TEA 3% NaCl (BWOW) 90% Fresh Water | 1479 | 2376 | |
| 2-6 | 10% TEA 3% CaCl$_2$ (BWOW) 90% Fresh Water | 1579 | 2611 | |
| 2-7 | 10% TEA 90% Sea Water | 1594 | 2146 | |

From the foregoing, it can be seen that this invention achieves the objects delineated hereinbefore. More specifically, it provide an accelerator that can be employed to accelerate the set of a retarded cement regardless of where it's used or how it became retarded. This includes avoiding too great a retardation.

Although the invention has been described with a certain degree of particularity, it is understood that the present disclosure is made only by way of example and that numerous changes in the details of construction and the combination and arrangement of steps of the method may be resorted to though departed from the spirit and scope of the invention.

What is claimed is:

1. A method of treating a well completed into subterranean formations for producing a desired hydrocarbonaceous fluid therefrom which includes the steps of:
   setting a packer and squeezing retarded cement into one of open perforations, voids behind the casing and in the formation and any open area of the wellbore, the improvement comprising:
   washing over the cement with an overwash comprising a solution of a compatible accelerator selected from the group consisting of triethanolamine, diethanolamine, and monoethanolamine in a concentration sufficient to effect acceleration of the set of the cement slurry compared to the set of the cement slurry without the compatible accelerator.

2. The method of claim 1 wherein said compatible accelerator is present in a concentration of about 0.1 percent (%) to 100% by volume of overwash fluid.

3. The method of claim 2 wherein said compatible accelerator is triethanolamine.

4. In a method of setting a cement plug in a well completed in a subterranean formation which a retarded cement is pumped into the well and allowed to set to form a plug therewithin, the improvement comprising:
   washing over set cement with an overwash comprising solution of a compatible accelerator selected from a group consisting of triethanolamine, diethanolamine and monoethanolamine in a concentration sufficient to affect acceleration of the set of said cement.

5. The method of claim 4 wherein said compatible accelerators present a concentration of about 0.1 to 100% by volume of the overwash fluid.

6. In the method of claim 5 wherein said compatible accelerator is triethanolamine.

7. In a method of accelerating the set of cement at the top of liners within the well in which a retarded cement is pumped into the well and allowed to set about top of said liner, improvement comprising:
   washing over said cement with a solution of a compatible accelerator selected from the group consisting of triethanolamine, diethanolamine and monoethanolamine in a concentration sufficient to effect acceleration of the set of said cement.

8. In the method of claim 7 wherein said compatible accelerator is triethanolamine.

9. In a method of accelerating the set of cement at the top of liners within the well in which a retarded cement is pumped into the well and allowed to set about top of said liner, improvement comprising:
   washing over said cement with a solution of a compatible accelerator selected from the group consisting of triethanolamine, diethanolamine and monoethanolamine in a concentration sufficient to effect acceleration of the set of said cement.

* * * * *

UNITED STATES PATENT AND TRADEMARK OFFICE
CERTIFICATE OF CORRECTION

PATENT NO. : 4,976,316
DATED : 12-11-90
INVENTOR(S) : Robert B. Carpenter and William N. Wilson It is certified that error appears in the above—identified patent and that said Letters Patent is hereby corrected as shown below:

Please cancel claim 9 and substitute therefor claim 5. (Column 6, line 10)

5. In a method of setting a cement plug in a well completed in a subterranean formation in which a retarded cement is pumped into the well and allowed to set to form a plug therewithin:
the improvement comprising:
injecting a compatible accelerator selected from the group consisting of triethanolamine, diethanolamine and monoethanolamine in a concentration sufficient to effect acceleration of the set of said cement in an area adjacent where the cement is to be placed, followed by said cement to effect in situ mixing with said cement and acceleration of the set of said cement.

Signed and Sealed this

Thirteenth Day of October, 1992

Attest:

DOUGLAS B. COMER

*Attesting Officer*   Acting Commissioner of Patents and Trademarks